United States Patent [19]

Harrison et al.

[11] 4,237,770
[45] Dec. 9, 1980

[54] POPPET MEMBER FOR A CONTROL VALVE

[75] Inventors: Gregory K. Harrison, Niles, Mich.; George D. Pope; Richard F. Riel, both of Granger, Ind.; Donald A. Kobb; Charley T. Kelley, both of Mishawaka, Ind.; David J. Lawrence, South Bend, Ind.; Donald R. Conn, South Bend, Ind.; Richard C. Odom, South Bend, Ind.

[73] Assignee: Tne Bendix Corporation, Southfield, Mich.

[21] Appl. No.: 63,281

[22] Filed: Aug. 2, 1979

[51] Int. Cl.³ .............................................. F15B 9/10
[52] U.S. Cl. ..................................... 91/369 A; 92/99
[58] Field of Search ............. 91/369 R, 369 A, 369 B; 92/85 R, 85 A, 85 B, 99

[56] References Cited

U.S. PATENT DOCUMENTS

| 3,053,235 | 9/1962 | Hoger | 92/99 |
| 3,152,449 | 10/1969 | Schultz | 91/369 A X |
| 3,289,547 | 12/1966 | Kytta | 91/369 A |
| 3,312,147 | 4/1967 | Reichard | 91/369 A |
| 3,352,209 | 11/1967 | Cripe | 92/99 X |
| 3,880,049 | 4/1975 | Grabb | 92/99 X |
| 4,066,005 | 1/1978 | Farr | 91/369 B |

Primary Examiner—Edward J. McCarthy
Attorney, Agent, or Firm—Leo H. McCormick, Jr.; Ken C. Decker

[57] ABSTRACT

A valve for use in a pressure differentially operated servo-motor to regulate the flow of fluid through a bore in a hub from first and second sources in response to movement of an input member by an operator. The valve has a resilient disc member with a peripheral surface and a central opening. First and second annular ribs symmetrically extend from opposite sides of the disc adjacent the central opening. A spring connected to the input member holds the peripheral surface in sealing engagement with the hub. In a first mode of operation, the spring holds the input member against the first annular rib to allow the fluid from the first source to freely communicate between first and second passages in the hub by way of the bore. In a second mode or operation, the input member moves out of contact with the first rib; however, the internal resiliency of the disc and a pressure differential created across the disc between the first and second sources of fluid moves the first rib into contact with a seat in the hub to inhibit flow communication of and fluid from the first source through the bore while allowing the fluid from the second source to freely flow through the second passage to create the pressure differential from operating the servomotor.

8 Claims, 6 Drawing Figures

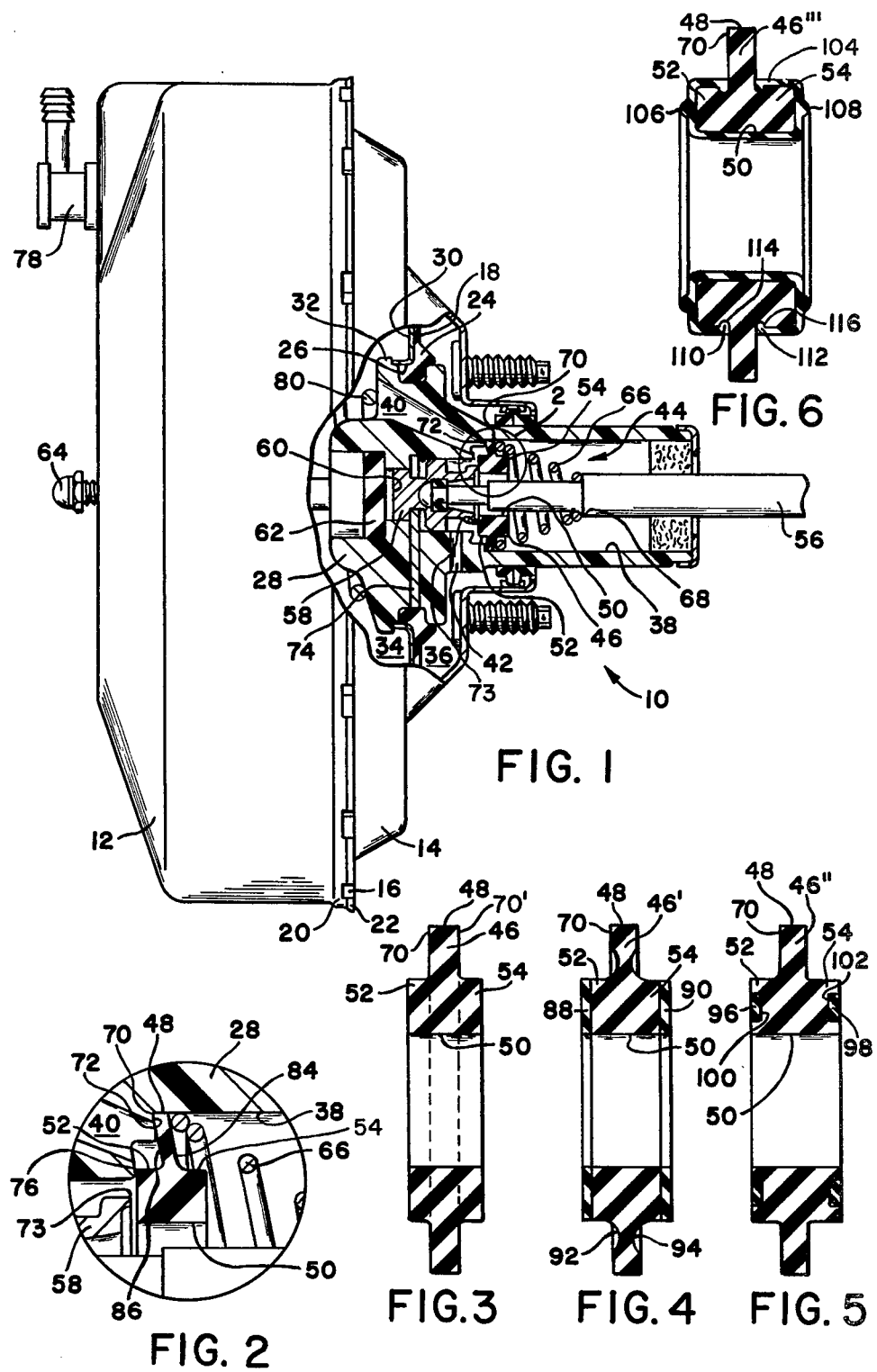

POPPET MEMBER FOR A CONTROL VALVE

BACKGROUND OF THE INVENTION

This invention relates to a valve for a fluid pressure motor. The valve responds to an operator input to control the communication of fluid through a hub from a first source to both sides of a diaphragm that separates a housing into first and second chambers in a first mode of operation and from a second source to the second chamber to create a pressure differential across the diaphragm in a second mode of operation. This pressure differential acts on the diaphragm and produces an output force which corresponds to an input force.

Control valves in the prior art of which the poppet valve disclosed in U.S. Pat. No. 3,053,235 and the slide valve disclosed in U.S. Pat. No. 3,106,873 are typical, are adequate for most operational needs. However, with a decrease in the size of vehicles, the under hood available space for fluid pressure motors has also decreased making it desirable to make such fluid pressure motors more compact without reducing the efficiency thereof.

In fluid pressure motors having poppet valves, the overall axial dimension from the sealing face to the rear of the attachment bead on the hub of the movable wall is between $\frac{3}{4}''$ to $1''$. However, the actual movement required by the sealing face to control the communication of fluid between passages in the hub and the bore is only about $\frac{1}{8}''$. If the overall axial length of the poppet valve were reduced to approximately the operational travel length, the axial dimension of the hub of the fluid pressure motor could correspondingly be reduced and as such could be easier located in available under hood space of the vehicle.

Similarly in fluid pressure motors having slide valves, the operational travel is dependent on the size of the passage in the hub and the width of the sealing rib. Unfortunately in such slide valves, wear or scoring can damage the sealing surfaces and as a result after a period of use the operational pressure differential is reduced since leak paths develop between the various passages. Thus, such slide valves have not received customer acceptance for use in fluid pressure motors of brake systems of vehicles.

SUMMARY OF THE INVENTION

We have devised a valve for controlling the communication of first and second fluids between first and second chambers separated by a movable wall. A first passage connects the first chamber to a bore and a second passage connects the second chamber to the bore. An input signal from an operator allows the valve to interrupt communication of the first fluid between the first and second chambers and allow communication from the second fluid to the second chamber to create a pressure differential. This pressure differential acts on the movable wall to thereafter develop an output force corresponding to the input force.

The valve has a disc shaped resilient member with a peripheral edge held against a shoulder by a return spring connected to an input push rod and a central opening through which the second fluid is communicated to the second chamber. The return spring holds a plunger connected to the input push rod against an annular rib to allow free communication of the first fluid between the first and second chambers in the absence of an operator input. Whenever an operator input is applied to the input push rod, the plunger moves. Thereafter, the internal resiliency of the disc member and the pressure differential across the disc between the first and second fluids moves a rib into engagement with a seat to seal the first chamber from the second chamber and allow the second fluid to be communicated to the second chamber whereby the operational pressure differential is created across the movable wall.

It is an advantageous effect of this invention to provide a valve for a fluid pressure motor having a disc whose internal resiliency is enhanced by a pressure differential to move a surface thereon into engagement with a seat and thereby seal a passageway to permit the development of an operational pressure differential across a movable wall in the fluid pressure motor.

It is another advantageous effect of this invention to provide a disc of a valve member with a pliable surface that readily conforms to a seat to seal a first passage from a second passage.

It is a still further advantage of this invention to provide a valve with a disc to control the flow of communication between different flow paths therein corresponding to an operator input.

These and other objects should be apparent from reading this specification and viewing the drawings.

BRIEF DESCRIPTION OF THE DRAWINGS

FIG. 1 is a sectional view of a fluid pressure motor having a valve therein made according to the principles of this invention;

FIG. 2 is an enlarged view of the circumscribed section 2 in FIG. 1;

FIG. 3 is a sectional view of the disc in the control valve of FIG. 1;

FIG. 4 is a sectional view of another disc for use in a control valve having a pliable seating surface thereon;

FIG. 5 is another disc for use in a control valve having a reinforcing insert member therein; and FIG. 6 is another disc for use in a contro valve having an end cap thereon with a contoured surface that substantially matches first and second seating surfaces in the fluid pressure motor to regulate the flow of fluid therein.

DETAILED DESCRIPTION OF THE INVENTION

The fluid pressure motor 10 has a first shell 12 joined to a second shell 14 by a closure arrangement 16 which is disclosed in U.S. Pat. No. 3,977,299. A diaphragm 18, which has a first bead held by the closure arrangement 16 formed by the shoulder 20 on the first shell 12 and peripheral surface 22 on the second shell 14 has a second bead 24 located in groove 26 on hub 28 to position plate 30 against shoulder 32. The plate 30, diaphragm 18 and hub 28 divide the interior of the first and second shells 12 and 14 into a first chamber 34 and a second chamber 36.

The hub 28 has a stepped bore 38 therethrough which is connected to the first chamber 34 by a first passage 40 and to the second chamber 36 by a second passage 42. A valve arrangement 44, which is located in bore 38, controls the flow communication between the first and second chambers 34 and 36, respectively, through the first and second passages 40 and 42.

The valve arrangement 44 is connected to an input push rod 56 through a plunger 58. Plunger 58 has a face 60 which engages reaction disc 62 located in bore 38 to provide an operator with a feedback force corresponding to the output force being transmitted from the fluid pressure motor through output push rod 64.

In more particular detail, the valve arrangement 44 includes a disc 46 which has a peripheral surface 48 that engages bore 38 and a central opening 52. First and second annular ribs 50 and 54 extend from the disc 46 adjacent the central opening 50, as best shown in FIG. 3. A return spring 66 located between shoulder 68 on push rod 56 and the disc 46 holds surface 70 against shoulder 72 in stepped bore 38 to prevent fluid communication along a flow path between peripheral surface 48 and bore 38. In addition, an interference seal may be provided between the peripheral surface 48 and bore 38 to further prevent fluid communication along such a flow path. The return spring 66 acts on push rod 56 to hold face 73 on plunger 58 against rib 52 to provide a flow path from the first passage 40 to the second passage 42 through the bore 38. A stop 74 engages plunger 58 to limit the movement of plunger 58 in the bore 38 and thereby control the distance between rib 52 and seat 76 between passages 40 and 42.

It should be recognized that disc 46 cannot be improperly inserted in bore 38 since ribs 52 and 54 are symmetrical with respect to the disc 46. Thus, this type of valve 44 can easily be adapted to automated assembly procedures without the need for aligning the rib with seat 76 before insertion into bore 38.

MODE OF OPERATION OF THE INVENTION

The fluid pressure motor 10 is normally installed as a power assist device in the brake system of a vehicle. When such a vehicle is operating, a first fluid, normally the vacuum produced at the intake manifold, is communicated to the first chamber 34. Thereafter, the fluid in pressure motor 10 is evacuated by flowing from the second chamber 36 through the second passage 42, bore 38, the first passage 40 and the first chamber 34 to suspend the movable diaphragm 18 and backing plate 30 in the first fluid. With the movable diaphragm 18 and backing plate 30 suspended in the first fluid, return spring 80 urges the hub 28 toward shell 14.

In a first mode of operation, as shown in FIG. 1, there is no input applied to push rod 56. Thus, return spring 66 moves plunger face 72 against rib 52 to seal the flow path between the first and second passages 40 and 42 from being exposed to a second fluid, air at atmospheric pressure, in bore 38. The second fluid (air) in bore 38 and the first fluid (vacuum) in the first passage 40 create a pressure differential across disc 46 that urges the face on rib 52 into engagement with face 73 on plunger 58 to reinforce the seal between bore 38 and the flow path between the first and second passages 40 and 42.

When an operator desires to effect a brake application, an input force acts on push rod 56 to move plunger 58 toward the reaction disc 62. The internal resiliency of the disc 46 and the pressure differential thereacross moves rib 52 with face 73 until rib 52 engages seat 76 as shown in FIG. 2. Thereafter, plunger 58 moves away from of rib 52 to allow air in bore 38 to flow through the central opening 50 and into the second passage 42 for distribution to the second chamber 36. With the second fluid, air at atmospheric pressure, in the second chamber 36 and the first fluid, air reduced to the level of the vacuum produced at the intake manifold or by an air pump, in the first chamber 34, a pressure differential is created across the diaphragm 18 and backing plate 30. This pressure differential acts on the diaphragm 18 and backing plate 30 to develop an operational force corresponding to the input force that is transmitted to the output push rod 64 by way of hub 28 and reaction disc 62. The resistance to movement of push rod 64 is carried through reaction disc 62 and into plunger 58 to provide the operator with an indication of the operational force supplied to the push rod 64.

On termination of the input force, return spring 66 acts on push rod 56 to move face 60 on plunger 58 out of engagement with reaction disc 62 and face 73 into engagement with rib 52 to interrupt flow communication of the second fluid through the axial opening 50. Thereafter, rib 52 moves away from seat 76 to re-establish flow communication between the first passage 40 and the second passage 42 through bore 38. With flow communication unrestricted between the first passage 40 and the second passage 42, the second fluid in chamber 36 is evacuated by the first fluid to suspend the diaphragm 18 and backing plate 30 in the first fluid and allow return spring 80 to move hub 28 toward shell 14. Thereafter, the diaphragm 18 and hub 28 assume a position as shown in FIG. 1 until the operator again applies an input force to push rod 56.

It should be noted that movement of the rib 52 through movement of plunger 58 by the return spring 66, causes the material of disc 46 to be compressed along surface 84 and expanded along surface 86, as shown in FIG. 2. The material is such that it attempts to return to the shape shown in FIG. 3. This internal resiliency is sufficient to hold rib 52 against seat 76 and seal passage 40 from bore 38 when the fluid pressure motor 10 is operating in the motor shown in FIG. 2.

Thus, the operation of fluid pressure motor 10 by valve 44 is achieved through sequential movement away from seat 76 by spring 66 acting through push rod 56 and plunger 58 to provide free communication between the first and second chambers and through the internal resiliency of the disc aided by any pressure differential between the first fluid and the second fluid to seat the face of rib 52 on seat 76 and seal the first passage 40 from the bore 38. With passage 40 sealed, the second fluid is communicated to the second chamber whereby a fluid pressure differential is developed to produce the output force transmitted through push rod 64.

The symmetrical attachment of rib 54 to disc 46 with respect to rib 52 provides for automatic assembly of valve 44 since it eliminates misassembly of a sealing face with respect to either plunger 58 or seat 76 on hub 28.

For some applications the development of the seal between the disc 46, seat 76 and face 73 may be enhanced through the addition of as ring of pliable material 88 and 90 as shown in FIG. 4 attached to each ribs 52 and 54. If the pliable material has a different modulus of elasticity than the rib it may better conform to the surface of seat 76 and surface 73. Thus, the internal resiliency and closure pressure differential which developed across the disc 46 can easier seal passage 40 and bore 38 from each other.

Similarly, in order to obtain greater flexibility for disc 46′, the cross sectional area between the peripheral surface sealing surface 70 and 70′ and ribs 52 and 54 was reduced to establish contour surface 92 and 94 shown in FIG. 4. When the disc 46′ possesses contour surfaces 92 and 94, the internal resiliency is decreased however, the closure pressure differential force can more easily move rib 52 into engagement with seat 76 to assure an operational seal is produced whenever plunger face 73 moves out of engagement with surface 88. Thus, the combined sealing force remains substantially the same under normal conditions, however, in extreme cold operating conditions below 0° F., the reduced cross sectional area of disc 46' should provide for an increase in the time of response for the sealing to occur over disc 46.

In disc 46" shown in FIG. 5, reinforcing rings 96 and 98 have been located in grooves 100 and 102 in ribs 52 and 54, respectively. The reinforcing rings 96 and 98 which are made of different material than ribs 52 and 54 provide disc 46 with structural stability should the pressure differential between the first fluid in passage 40 and the second fluid in bore 38 be of sufficient strength to move the body of disc 46" into passage 40. Thus disc 46" should remain centered in bore 38 and the seating surface remain in alignment to effectively seal the passages during operation of the fluid pressure motor 10.

In the disc 46''' shown in FIG. 6, an end cap 104, that surrounds ribs 52 and 54, has been added in order to provide a pliable seating surface to enhance the sealing between the valve 44 and seats 76 and 73 on the hub 28 and plunger 58. In order to assure that end cap 104 stays attached to disc 46''', beads 110 and 112 are snapped into grooves 114 and 116, respectively. The end cap 104 has first and second annular contour surfaces 106 and 108 that extend in a plane substantially perpendicular to disc 46'''. The annular contour surfaces 106 and 108 provide a larger seating area for engagement of seat 76 and surface 73 to assure that communication of the first fluid through passage 40 and to chamber 36 and the second fluid through opening 50 to chamber 36 are not commingled. Thus, the maximum operational output force produced by the fluid pressure motor 10 should remain substantially identical on repeated applications of the same input force applied to push rod 56 with the same levels of pressure available to the first and second fluids.

Thus, the disc 46 and the various modifications associated therewith provide valve 44 with a movable member which responds to a sealing pressure differential to establish predictable operational parameters for the fluid pressure motor 10 that correspond to set input conditions.

We claim:

1. In a servomotor having a movable wall with a hub having a bore therethrough for connecting a first passage with a second passage, a valve located in the bore having a first mode of operation wherein fluid from a first source freely flows between the first passage and the second passage and a second mode of operation wherein fluid communication from the first source through the first passage is interrupted and fluid communication from a second source flows through the bore and second passage to create an operational pressure differential across the movable wall, an input member responsive to an operator input for allowing the valve to operate in one of the first and second modes of operation, and an output member connected to the movable wall for transmitting an output force corresponding to an input force corresponding to an input force during the first and second modes of operation, the improvement wherein the valve comprises:
   a disc having a peripheral surface and a central opening;
   first and second annular ribs symmetrically extending from opposite sides of said disc adjacent the central opening; and
   a spring connected to said input member which holds said peripheral surface in a sealing engagement with the hub and the input member into sealing engagement with said first annular rib in the first mode of operation, said disc having sufficient internal resiliency to urge said first annular rib into sealing engagement with a seat in the hub to prevent communication of said first fluid through said first passage during the second mode of operation.

2. In the servomotor, as recited in claim 1 wherein the first and second sources of fluid act on said disc to create a pressure differential sealing force which is additive to the internal resiliency of the disc to assure that the sealing engagement between said first annular rib and hub occurs during the second mode of operation.

3. In the servomotor, as recited in claim 2 wherein said valve further includes:
   a first washer attached to said first rib, said first washer being made of a pliable material which matches the surface of the seat to further enhance the sealing engagement between said first annular rib and hub.

4. In the servomotor, as recited in claim 3, wherein said valve further includes:
   a second washer attached to said second rib and being made of the same pliable material as said first washer to provide a surface through which the sealing engagement could occur with the seat in the hub should the second washer be aligned with the seat during insertion of the disc into the bore.

5. In the servomotor as recited in claim 2 wherein said valve further includes:
   a first groove located on a first face of the first rib; and
   a first ring located in said first groove, said first ring being of a pliable material that conforms to the surface of the seat in said hub to further enhance the sealing engagement between the first annular rib and the hub.

6. In the servomotor, as recited in claim 5 wherein said valve further includes:
   a second groove located on a second face of the second rib; and
   a second ring located in said second groove and being made of the same pliable material as said first ring to provide a surface through which the sealing engagement could occur with the seat in the hub should the second ring be aligned with the seat on insertion of the disc in the bore.

7. In the servomotor, as recited in claim 2 wherein said valve further includes:
   an end cap that surrounds said first rib, said end cap having a contoured surface that matches the seat in the hub and the rear surface on a plunger connected to the input member, said spring moving the rear surface of the plunger into engagement with the contoured surface to allow a pressure differential sealing force created by the first and second fluids to urge the end cap against the rear surface and prevent communication of the second fluid from the bore during the first mode of operation, said pressure differential sealing force alone moving the contoured surface into sealing engagement with the seat in the hub during the second mode of operation to prevent communication of fluid from the second source into said first passage.

8. In the servomotor, as recited in claim 2 wherein said valve further includes:
   an end cap that surrounds said first and second ribs with first and second contoured surfaces that match the surface of the seat in the hub and a rear surface on a plunger connected to the input member, one of said first and second contoured surfaces engaging the rear surface of the plunger in the first mode of operation to inhibit the communication of fluid from the second source to the first and second passages and engaging the seat in the hub in the second mode of operation to inhibit communication of fluid from the second source to the first passage to prevent a reduction in the operational pressure differential through a dilution of the first source of fluid by the second source of fluid.

* * * * *